Nov.   3,282,666

Filed Dec. 3, 1962   3 Sheets-Sheet 1

TERENCE J. GALLAGHER
JOSEPH SINGER JR.
INVENTOR.

BY Jacques L. Meister
AGENT.

Nov. 1, 1966 T. J. GALLAGHER ETAL 3,282,666
PROCESS FOR MANUFACTURING FIBER OPTIC DEVICES
Filed Dec. 3, 1962 3 Sheets-Sheet 3

TERENCE J. GALLAGHER
JOSEPH SINGER JR.
INVENTOR.

BY Jacque L. Meister
AGENT.

United States Patent Office 3,282,666
Patented Nov. 1, 1966

3,282,666
PROCESS FOR MANUFACTURING FIBER
OPTIC DEVICES
Terence J. Gallagher, Mount Prospect, and Joseph Singer,
Jr., Arlington Heights, Ill., assignors to Chicago Aerial
Industries, Inc., Barrington, Ill., a corporation of Delaware
Filed Dec. 3, 1962, Ser. No. 242,016
6 Claims. (Cl. 65—4)

This invention relates generally to optical shape transducers and more particularly to a process for manufacturing an optical line-to-circle shape transducer.

Many of the envisaged accomplishments of fiber optic technology lie in the area of scanning devices where the presence of fiber optic elements often enables a complete elimination of optical elements or alternatively the accomplishment of technical objectives not feasible with conventional optical techniques alone. One such scanning device which has been frequently described in the contemporary literature is the fiber optic line-to-circle shape transducer. Because of the inherent simplicity of facsimile scanning systems employing the line-to-circle shape transducer, a considerable interest in such shape transducers has been aroused. However, serious technical difficulties encountered in the fabrication of the shape transducer have thus far inhibited its use.

Fiber optic line-to-circle shape transducers have their resolution limited by the thickness of the fiber optic strip from which they are constructed. Until quite recently no completely satisfactory and economical method had been discovered to manufacture such strips as wide as desired while still maintaining a thickness on the order of 0.001 inch. Additionally, even when such strips were laboriously and expensively constructed, there remained the still difficult problem of forming one end of the strip into the circular shape desired while maintaining the other end of the strip in a linear condition.

Many applications of the fiber optic line-to-circle shape transducer require a shape transducer having a ratio of overall length to diameter of its circular end of two and one-half to one or less. However, whenever, attempts were made to construct shape transducers having a length to diameter ratio of less than about 5, severe fabrication problems were encountered. These problems in fabrication are caused by the severe transitional curves required of the individual fibers intermediate their ends and have generally been insoluble.

Accordingly, it is an object of this invention to provide a method for manufacturing fiber optic line-to-circle shape transducers having a smaller than heretofore possible ratio between their overall length and the diameter of their circular end.

Another object of this invention is to provide an improved method for manufacturing fiber optic line-to-circle shape transducers.

Yet another object of this invention is to provide an improved method of manufacturing fiber optic tubes, which tubes may be employed in the manufacture of line-to-circle transducers.

An important object of this invention is to provide a method for manufacturing fiber optic line-to-circle shape transducers more economically than heretofore possible.

Still further objects and features of the invention pertain to the particular structure, arrangements and processes whereby the above and other objects described in the specification are attained.

The structure of a fiber optic line-to-circle shape transducer comprises one or more rows of fibers arranged to form a circle at one of their ends and fanned out to form a line at their other extremity. In following the inventive process for manufacturing such a shape transducer, optical fibers may be arranged about a common axis and fused to form a tube utilizing an extension of the process described by Joseph Singer, Jr., in his United States patent application Serial No. 216,646 filed August 13, 1962. After forming the fiber optic tube, the tube is slotted parallel to the tube axis. The slotted tube is then placed in a fixture in an oven and rotated at high speed at a relatively high temperature. There, under the action of centrifugal forces and the softening action of the heat, the fiber optic tube is formed into a shape from which two line-to-circle shape transducers may be fashioned. Other features and advantages of this invention will be apparent from the following description, taken in connection with the accompanying drawing, in which:

Figure 1:
FIGURE 1 is illustrative of the fiber optic line-to-circle shape transducer which it is desired to fashion utilizing the method of the invention.

Referring now in detail to the drawing, and specifically to FIGURE 1 thereof, there is shown a fiber optic line-to-circle shape transducer of a type amenable to production by the inventive process. The shape transducer is generally indicated at 10 and is comprised of a plurality of optical fibers formed intermediate their ends so that one end the fibers ar arranged to form a circle and at the other end arranged to form a line. As used in the following description, optical fibers are defined as fibers, usually but not necessarily of glass, transparent to the radiation it is desired to transmit and which may or may not be coated with material having a refractive index different than that of the fibers. Additionally the term optical fibers includes fibers manufactured under a process known in the art as a multiple fiber redraw. Individual ones of the fibers so manufactured are comprised of a plurality of smaller fibers.

The ends of the fibers adjacent to each other at the circular end of a shape transducer are required to be adjacent to each other at the line end. To achieve these configurations the inventive process provides that the line-to-circle shape transducer be manufactured in pairs from a tube in the following manner. While the inventive process described hereinafter results in the simultaneous manufacture of a pair of shape transducers and the inventors believe that the simultaneous making of a pair is the most efficient method of manufacture and results in higher quality products then when a single shape transducer is manufactured at one time; it will be obvious to those skilled in the art that small variations in the described process will permit the manufacture of individual shape transducers.

Figure 2:
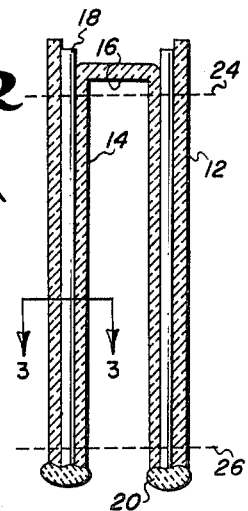
FIGURE 2 is a cross section taken through a tube assembly during its manufacture.
Figure 3:
FIGURE 3 is a cross section taken at 3—3 in FIGURE 2 and is further illustrative of the inventive tube construction.

FIGURE 2 is illustrative of both the construction of the fiber optic tube 11 of the invention and also of the process of making it. Illustrated in FIGURE 2, in cross section, is an outer cylindrical tube 12 and coaxially therewith an inner cylindrical tube 14. Both tubes 12 and 14 may advantageously be fabricated of soda lime glass having a wall thickness of approximately 0.020 inch. The tube 14 is self closed at one end 16 to facilitate insertion of fibers in the space between the two tubes. Assembled in the annular space between the tubes 12 and 14 are a plurality of radiation conducting fibers or elements 18. The fibers 18 are positioned with their axes parallel to the common axis of the tubes 14 and 16 and with each of the individual fibers 18 being positioned in tangential conterminous relationship to the fibers 18 on either side. A cross section of the tubes 14 and 16 taken at 3—3 in FIGURE 2 is illustrated in FIGURE 3. As there illustrated, the annular space $a$ is completely filled with the optical fibers 18. In embodiments constructed to date having the cross section appearance illustrated in FIGURE 3, the annular space $a$ has been varied between 0.004 inch wide and 0.030 inch wide, the space being maintained approximately 0.001 inch greater than the diameter of the fibers 18.

After filling the annular space between the tubes 14 and 16 with radiation conducting fibers or rods, the bottom end of the tube assembly 11 is sealed as indicated to facilitate handling during the subsequent fusing operation. One sealing material that has proved satisfactory in practice is the refractory cement known commercially as "Sauerisen #1." While refractory cement is presently preferred for sealing the ends of the tubes, other methods of sealing the ends of the tubes together would be satisfactory and might, in certain circumstances, be advantageous. After having its bottom end sealed in this manner, the tube assembly 11 is ready to be fused together to form the composite tube assembly used in the next stage of processing.

Figure 4:
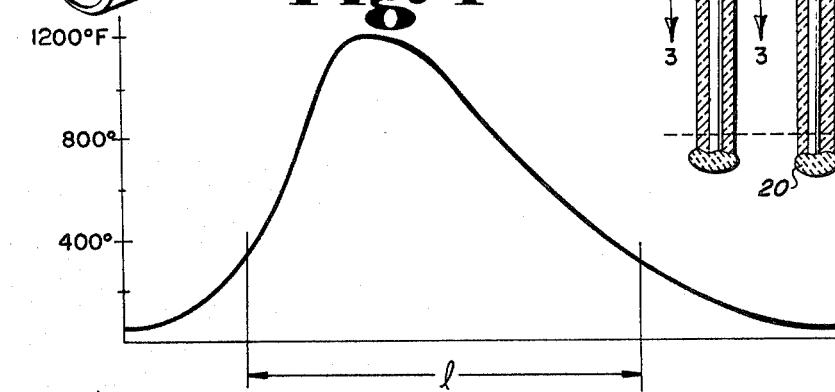
FIGURE 4 is a temperature-distance graph illustrative of temperatures to which the tube assembly of FIGURE 2 may be subjected in various regions of a furnace as the tube assembly is fused.

Fusing of the tube assembly 11 is achieved by slowly passing the assembly through an oven having approximately the temperature characteristics indicated in FIGURE 4. The length 1 indicated in FIGURE 4 is the actual length of the fusing oven. Since the ovens employed have had open ends, temperatures considerably above ambient are encountered outside the ovens adjacent these ends. While the temperatures indicated in FIGURE 4 are typical only for a particular tube assemblies' materials; a particular feed rate of the tube, etc., it can generally be stated that for most glass-like materials, the temperature will be adjusted to maintain a particular viscosity of the tube materials when passing through the maximum temperature area of the oven. This viscosity is between $10^7$ and $10^{13}$ poises depending on the several variables. In the preferred practice of the invention, the temperature has ranged between 1000° F. and 1400° F. in achieving the desired viscosity. The tube assembly is fed into the oven at a rate that depends on tube size and material and on oven temperature. Generally these feed rates have been in the range of 10 to 50 inches per hour.

Reduction of the diameter of tube assembly 11 by a drawing operation conducted simultaneously with the fusing operation is not described herein since a discussion of the process involved is irrelevant to the description of the process of manufacturing a shape transducer. However, such a reduction in diameter is not outside the scope of the invention.

After the tube assembly 11 has been fused following the procedure outlined above, its ends are removed to eliminate those portions having no further function in the process and as preparation for the final finishing later performed. Advantageously the ends may be removed, by sawing at the points indicated by the dotted lines 24 and 26 in FIGURE 2. Next in the inventive process, a slit is made in one wall of the tube assembly parallel to the tube axis and extending along its full length with the exception of the distances $d$ at either end. Generally, it has been found advisable to maintain the distances $d$ equal to approximately ⅓ that of the hole diameter of the tube assembly, and in no event less than approximately ¼ inch. However, in investigating the limits of the process the distances $d$ have been experimentally reduced to zero. While it has been found that zero is a feasible distance, it has not to date proven practical because extremely precise viscosity control then becomes mandatory during the subsequent centrifugal forming operation. While the slitting of the tube assembly is described herein as a separate process step accomplished before assembly of the tube into the spinning fixture, it has been contemplated that the spinning fixture may in some instances be advantageously employed, at least in part, as a holding fixture during the slitting operation. To reduce stress concentrations at the sawed surfaces they may advantageously be treated with a low melting point glass frit painted thereon. The appearance of the tube assembly after slitting and other preparations have been completed is illustrated at 27 in FIGURE 5.

Figure 5:
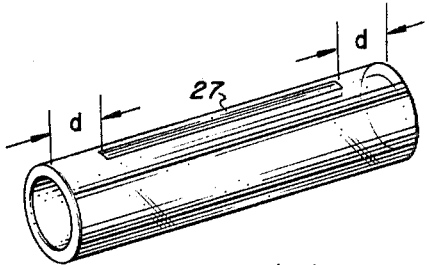
FIGURE 5 is a view in perspective showing the tube assembly of FIGURE 2 after preparation of its ends and slitting.

In the next stage of tube processing, the slit tube 27 illustrated in FIGURE 5 is assembled into a specially designed fixture, placed in an oven and rotated at high speed. There, under the influence of the temperature and the centrifugal forces caused by the rotation of the fixture, the final forming of the line-to-shape transducer is accomplished. The fixture used in spinning the slit tube 27 is illlustrated in exploded form in FIGURE 6 of the drawing.

Figure 6:
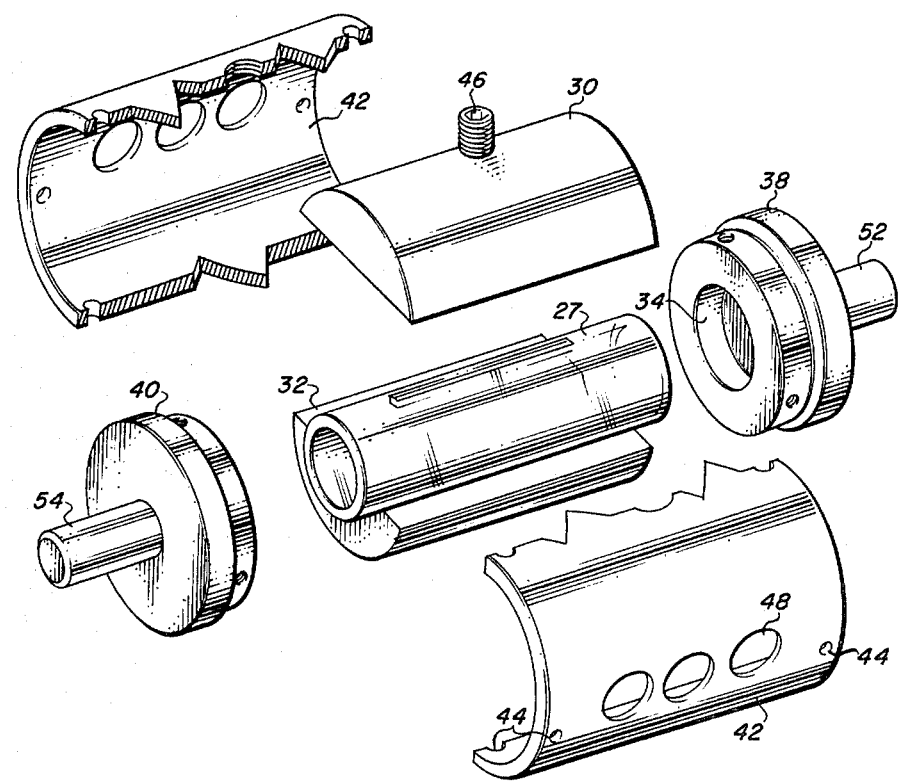
FIGURE 6 illustrates in exploded perspective form the positioning of the tube of FIGURE 5 in a fixture assembly prior to final forming.

The slit tube 27 is positioned between two form blocks 30 and 32 each of which has a D shaped cross section in the illustrative fixture embodiment of FIGURE 6. While the form blocks 30 and 32 have a flat plane surface positioned adjacent tube assembly 27, it is believed to be obvious that under certain conditions and depending on the finished shape desired, the form blocks may with advantage in some instances present a forming surface other than a flat plane. The unslit ends of tube assembly 27 are received into recesses 34 and 36 in end caps 38 and 40, respectively.

To insure uniform results during forming, the slit in the tube assembly 27 should be positioned so that a radial line passing through the fixture axis of rotation and the slit is perpendicular to the parallel surfaces of the form blocks. An outer cylindrical shell 42 surrounds the two form blocks and tube assembly 27 and is secured to the end caps by means of a plurality of screws 44. Not shown, but understood to be present, are suitable fastening means to secure the form blocks 30 and 32 to the outer cylindrical shell 42, when the forming operation begins. A set screw 46 entering into the slit of the slit tube is provided to insure this relationship although any other equivalent locating means could be employed.

To permit visual observation of the forming operation a plurality of apertures 48 are provided in the outer cylindrical shell 42. The apertures are situated diametrically opposite each other and in alignment with the space between the form blocks occupied by tube assembly 27. Then if the apertures are illuminated by a stroboscopic lamp flashing at a frequency that is some multiple of fixture rotation frequency, the forming operation may be observed.

Because the fixture and tube assembly 27 will be subjected to temperatures on the order of 1000° F. to 1400° F. it has been found advantageous in the embodiments thus far constructed to manufacture the fixture from a 42% nickel-iron alloy having a nearly identical coefficient of expansion and contraction to that of the glasses usually employed in the slit tube assembly. In addition to its desirable expansion characteristics, this 42% nickel-iron alloy material has proven desirable because of its increased life expectancy over materials that might be used in its place, such as graphite or one of the ceramics. While not absolutely necessary, it has proved advantageous to coat the nickel-iron material of the fixture with a parting agent before positioning the tube assembly 27 in the fixture. Among the useful parting agents is cerium oxide although other fine powder refractory materials such as zirconium oxide or aluminum oxide may equaly well be employed. Sheet mica has also proven useful as a parting agent.

Figure 7:
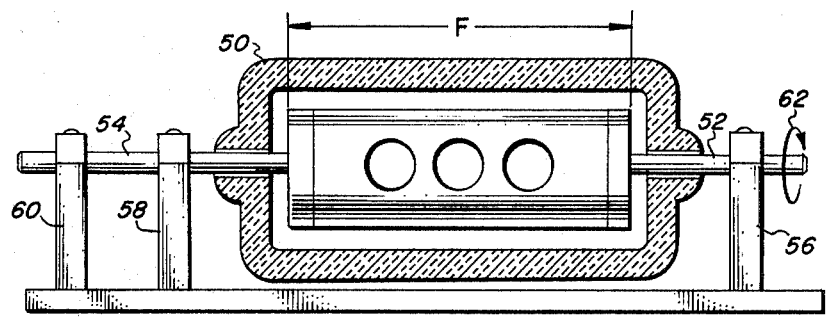
FIGURE 7 illustrates the fixture assembly of FIGURE 6, assembled in an oven for spinning under the influence of temperature.

After assembly of the fixture around the tube assembly 27, the fixture is positioned within the oven 50 illustrated in FIGURE 7. Extending through ports in the oven are the shafts 52 and 54 of end caps 38 and 40, respectively. Shafts 52 and 54 are received in bearings assembled in support blocks 56, 58 and 60 as illustrated in FIGURE 7. After the fixture has been assembled in the oven and its shaft captured in the bearings in the support assemblies, means for rotating the fixture about the shaft axis are attached to the shafts. The means for rotating the fixture is shown schematically as arrow 62. Since means 62 does not form a part of the invention and is conventional it is not further described.

Figure 8:
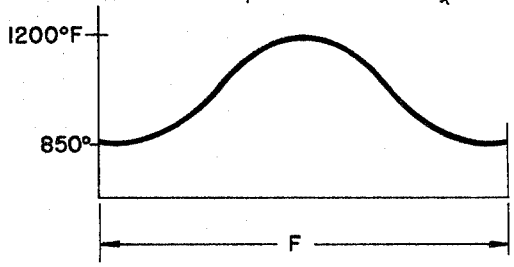
FIGURE 8 is a temperature-displacement graph illustrating a typical temperature distribution along the length of the fiber optic tube assembly during a spinning operation.

After assembly of the fixture within the oven 50, the oven is brought up to a controlled temperature as illustrated in the example of FIGURE 8. As therein shown the temperatures along the length F of the fixture are adjusted to maintain a relatively high temperature at the center of the fixture and lower temperatures at the end caps. While this temperature can be accomplished by differential control of the various heating elements within the oven, it has been found practicable to achieve the temperature differential by the simple expedient of opening or closing doors positioned around the shaft entrance ports to the oven. In the particular illustrative example of FIGURE 8, the oven temperature is maintained at approximately 1200° F. at the center of the fixture and at approximately 850° F. at the end caps of the fixture. Once the oven has been brought up to temperature, the fixture is rotated at high speed for a considerable length of time. For example, it has been found that for fiber optic tube assemblies 27 comprised of the lead-lime family of glasses, if the temperature at the center of the oven is maintained at 1180° F. and the fixture rotated at 4000 r.p.m., the tube assembly will be completely formed in approximately 20 minutes. Decreasing the temperature of the oven to 1150° F., and maintaining the time constant at 20 minutes, requires that the spinning speed be increased to 8000 r.p.m. to completely form the tube. As in the process step employed in forming tube assembly 27 temperature control is used to maintain the viscosity of the tube assembly between $10^7$ and $10^{13}$ poises in the region near the center of the fixture during the forming operation. Because higher viscosities are less likely to cause damage to the radiation transmitting fibers of tube 27, the higher viscosities are preferred. However, the temperature and resultant viscosity actually employed are dependent on tube material, spin rate, tube diameter, etc. In any event the spinning operation is continued until the fiber optic tube assembly assumes the form illustrated in FIGURE 9.

Figure 9:
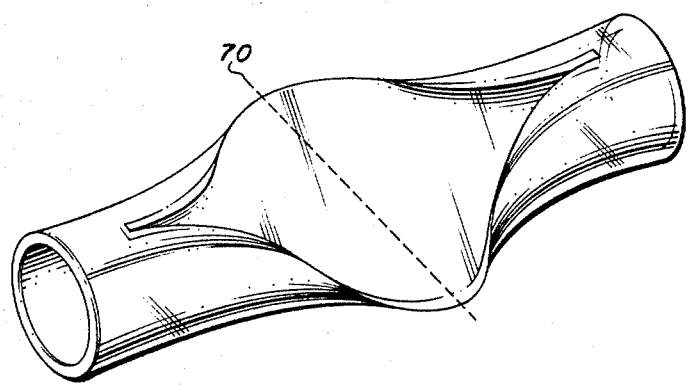
FIGURE 9 is a perspective illustration showing the appearance of the tube after spinning and before division into two separate optical fiber line-to-circle shape transducers.

As soon as the shape of FIGURE 9 is achieved, the spinning operation is halted and the formed tube of FIGURE 9 removed from the fixture. As can be readily seen, merely dividing the formed tube of FIGURE 9 at the point indicated by dotted line 70 will result in two line-to-circle shape transducers. The only operations then remaining are conventional optical polishing operations to provide suitable optical finishes at both extremities of each of the two line-to-circle shape transducers thus manufactured.

Figure 10:
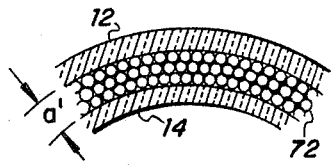
FIGURES 10–12 inclusive illustrate useful variations of the cross section of FIGURE 3.
Figure 11:
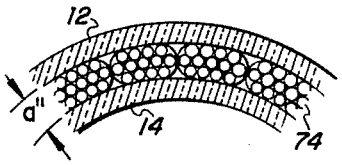
Figure 12:
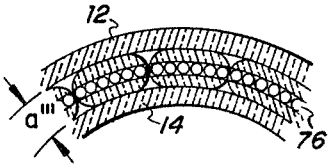

FIGURES 10, 11 and 12 illustrate variations in the construction of the cross section used in tube assembly 11 illustrated in FIGURE 2. These variations advantageously may be used as alternates to the construction shown in FIGURE 3. In each of the figures illustrating alternate constructions, the reference numerals 12 and 14 used in FIGURE 2 to refer to the outer and inner cylindrical tubes respectively, are repeated since the variation in construction affect only the width of the annular space between the tubes and the arrangement of optical fiber elements positioned therein.

FIGURE 10 illustrates a construction where the width of the annular space $a'$ is considerably greater than the diameter of the individual optical fibers 72. In embodiments constructed thus far, the individual fiber diameters used have varied between 0.004 and 0.010 inch with the space $a'$ varying between 0.009 and 0.042 inch.

FIGURES 11 and 12 are illustrative of constructions suggested by the aforementioned Joseph Singer, Jr., application. In the construction of FIGURE 11, the size of the multiple bundles 74 used has varied between 0.001" thick by 0.010" wide at the smallest to 0.060" thick by 0.080" wide at the largest. Thus far no limits on size have been encountered. Fiber sizes employed in the bundles have generally been in the 5 to 10 micron range and the width of the annular space $a''$ or $a'''$, has been maintained before fusing as nearly as possible at 0.001 inch greater than the thickness of the multiple bundle 74.

The construction illustrated in FIGURE 12 employs a type of multiple fiber bundle 76 best described in the Singer Jr., application. In brief, this type of bundle has a row of optical fibers arranged along a plane coextensive with major plane of symmetry. While the variations in cross section illustrated in FIGURES 10, 11 and 12 have proven useful for certain applications, many further variations are possible and might be required depending on the end use of the tube assembly 11. For example, in some applications it might be desirable to eliminate the supporting tubes 12 and 14. One way of achieving this result would be to manufacture the tube assembly 11 from a fused fiber block by turning and boring.

While particular methods of employing the inventive processes have been shown, and various sizes and compositions of materials described by way of example, it will be understood, of course, that the invention is not limited thereto since many modifications may be made; and it is therefore, contemplated to cover by the appended claims any such modifications as fall within the true spirit and scope of the invention.

What is claimed as the invention is,

1. A process for manufacturing fiber optical shape transducers from a generally cylindrically shaped slit fiber optic tube assembly comprising a plurality of optical fibers arranged parallel to each other in touching relationship and parallel to the longitudinal axis of symmetry of said slit tube assembly, said slot of said slit tube assembly being parallel to both said longitudinal axis of symmetry and to the axis of said optical fibers, comprising the steps of positioning said slit fiber optic tube assembly in a fixture adaptable for rotation about an axis, said fixture having recesses axially concentric with its rotational axis, said tube having its ends received into said recesses, subjecting the fixture to an elevated temperature sufficient to reduce the viscosity of the tube assembly at its center to between $10^7$ and $10^{13}$ poises, rotating the fixture at a speed sufficient to create a centrifugal force sufficient to deform said slit tube assembly and maintaining that speed until the slit tube assemblies shape conforms with that of the form blocks within the fixture, and removing the formed slit tube assembly from the fixture and dividing it into two parts along a line transverse the tube axis.

2. A process for manufacturing fiber optic shape transducers from a generally cylindrically shaped fiber optic tube assembly comprising a plurality of optical fibers arranged parallel to each other in touching relationship and parallel to the longitudinal axis of symmetry of said tube assembly, comprising the steps of slitting one wall of said fiber optic tube assembly parallel to said longitudinal axis of symmetry, assembling the slit fiber optic tube assembly into a fixture adaptable for rotation about an axis, said fixture having recesses axially concentric with its rotational axis, said tube assembly having both its ends received into said fixture, subjecting said fixture and said fiber optic tube assembly therein to an elevated temperature sufficient to reduce the viscosity of at least the center portion of said fiber optic tube assembly to between $10^7$ and $10^{13}$ poises, rotating said fixture about its rotational axis at a speed sufficient to create a centrifugal force sufficient to deform said fiber optic tube assembly and maintaining that speed until said tube assembly's shape at its center conforms with that of said fixture, and dividing said formed tube assembly into two parts along a line transverse the tube axis to form two shape transducers.

3. A process for manufacturing fiber optic shape transducers from a generally cylindrically shaped fiber optic tube assembly comprising a plurality of optical fibers arranged parallel to each other in touching relationship and parallel to the longitudinal axis of symmetry of said tube assembly, comprising the steps of slitting one wall of said fiber optic tube assembly parallel to the optical fibers and intermediate the ends thereof, assembling the slit fiber optic tube assembly into a fixture adaptable for rotation about an axis, said fixture having recesses axially concentric with its rotational axis, said slit fiber optic tube assembly having both its ends received into said recesses, subjecting said fixture and said fiber optic tube assembly therein to an elevated temperature sufficient to reduce the viscosity of the center portion of said fiber optic tube assembly to between $10^7$ and $10^{13}$ poises while rotating said fixture at a speed and for a sufficient time to cause said tube assembly's shape to be centrifugally formed to a desired shape, and dividing said formed fiber optic tube assembly into two parts along a line transverse the tube axis to form two shape transducers.

4. A process for manufacturing fiber optic line-to-circle shape transducers from a generally cylindrically shaped fiber optic tube assembly comprising a plurality of optical fibers arranged parallel to each other in touching relationship and parallel to the longitudinal axis of symmetry of said tube assembly comprising the steps of slitting one wall of said tube assembely parallel to its longitudinal axis of symmetry and parallel to the axes of its optical fibers, assembling said slit tube assembly into a fixture adaptable for rotation about an axis with said slit tube assembly being assembled between the parallel faces of form blocks of said fixture and having at least one of its ends received into a closely fitting recess located near the rotation axis of said fixture, said slit tube assembly being positioned and securely fixed relative to said form blocks so that a line passing through the center of said slit in said slit tube assembly, the axis of rotation of said fixture and through and perpendicular to the longitudinal axis of symmetry of said slit tube assembly to impinge on said form blocks is the shortest line that extends between said form blocks that fulfills these conditions, subjecting said fixture containing said slit tube assembly to a high temperature environment with the temperature maximum achieved in a zone enveloping the zone of desired maximum deformation of said slit tube assembly and regulated to some temperature within the range of 1000° F. to 1400° F., and concurrently with the step of subjecting said fixture to a high temperature environment, rotating said fixture at a speed sufficient to centrifugally deform said slit tube assembly until its shape at least partially conforms with the shape of said form blocks and that desired for the shape transducer.

5. A process for manufacturing fiber optic line-to-circle shape transducers from a generally cylindrically shaped fiber optic tube assembly comprising a plurality of optical fibers arranged parallel to each other in touching relationship and parallel to the longitudinal axis of symmetry of said tube assembly, comprising the steps of assembing said tube assembly into a fixture adaptable for rotation about an axis and having at least one recess located near the rotation axis of said fixture for receiving at least one of the ends of said tube assembly in a closely fitting relationship, said fixture having form blocks assembled about said tube assembly, slitting one wall of said tube assembly intermediate the ends thereof parallel to its longitudinal axis of symmetry and parallel to the axes of its optical fibers so that a line passing through the center of said slit, the axis of rotation of said fixture and through said longitudinal axis of symmetry of said slit tube assembly to impinge on the form blocks is the shortest line length possible, subjecting said fixture containing said slit tube assembly to a high temperature environment with the temperature maximum achieved in a zone enveloping the zone of desired maximum deformation of said slit tube assembly and regulated to some temperature between 1000° F. and 1400° F., and concurrently with the step of subjecting said fixture to a high temperature environment, rotating said fixture about its rotational axis at a speed sufficient to centrifugally deform said slit tube assembly into partial conformity with the surface of the form block diametrically opposite said slit.

6. A process for manufacturing fiber optic line-to-circle shape transducers from a generally cylindrically shaped fiber optic tube assembly comprising a plurality of optical fibers arranged parallel to each other in touching relationship and parallel to the longitudinal axis of symmetry of said tube assembly, comprising the steps of slitting one wall of said tube assembly intermediate the ends thereof and parallel to both its longitudinal axis of symmetry and to the axes of its optical fibers, assembling said slit tube assembly into a fixture adaptable for rotation about an axis, said slit tube assembly being assembled into said fixture in a fixed relationship to at least one form block contained in the fixture, said fixed relationship being achieved when a point on said slit tube assembly diametrically opposite said slot is as near the surface of said form block as possible, depositing a low melting point glass frit on the slit surfaces of said slit tube assembly, and subjecting at least a portion of said slit tube assembly to a temperature regulated within the range of 1150° F. to 1250° F., while concurrently rotating said fixture at a speed sufficient to effect the deformation of said slit tube assembly into at least partial conformity with said surface of said form block.

References Cited by the Examiner

UNITED STATES PATENTS

| | | | |
|---|---|---|---|
| 528,081 | 10/1894 | Croskey et al. | 65—71 |
| 2,354,931 | 8/1944 | Tolman. | |
| 2,979,632 | 4/1961 | MacNeille | 65—4 X |
| 2,992,956 | 7/1961 | Bazinet | 65—4 X |

DONALL H. SYLVESTER, *Primary Examiner.*

ROBERT L. LINDSAY, *Assistant Examiner.*